(12) United States Patent
Ishikawa et al.

(10) Patent No.: US 6,771,428 B2
(45) Date of Patent: Aug. 3, 2004

(54) GRADIENT INDEX ROD LENS, METHOD FOR MANUFACTURING GRADIENT INDEX ROD LENS, AND LENS ARRAY

(75) Inventors: Masatake Ishikawa, Osaka (JP); Hiroshi Koshi, Osaka (JP); Kazuya Ookawa, Osaka (JP); Satoshi Taniguchi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/011,265

(22) Filed: Dec. 3, 2001

(65) Prior Publication Data
US 2002/0097476 A1 Jul. 25, 2002

(30) Foreign Application Priority Data

Dec. 4, 2000  (JP) ........................... 2000-368714

(51) Int. Cl.[7] ............. G02B 3/00; G02B 27/10; C03C 25/00
(52) U.S. Cl. ............. 359/654; 359/623; 65/31
(58) Field of Search ............. 359/619, 621–623, 359/625, 626, 652–654; 65/30.13, 31, 37–39, 56, 30.1, 412

(56) References Cited

U.S. PATENT DOCUMENTS

| 4,789,219 A | | 12/1988 | Layne | |
|---|---|---|---|---|
| 5,032,000 A | * | 7/1991 | Shingaki et al. | 385/124 |
| 5,923,481 A | | 7/1999 | Skidmore et al. | |
| 6,088,166 A | * | 7/2000 | Lee | 359/654 |
| 6,263,133 B1 | * | 7/2001 | Hamm | 385/33 |

FOREIGN PATENT DOCUMENTS

| EP | 0 918 235 A2 | 5/1999 |
|---|---|---|
| JP | 58219507 | 12/1983 |
| JP | 59033415 | 2/1984 |

* cited by examiner

*Primary Examiner*—Georgia Epps
*Assistant Examiner*—William Choi
(74) *Attorney, Agent, or Firm*—Robert D. Buyan; Stout, Uxa, Buyan & Mullins, LLP.

(57) ABSTRACT

A compact gradient index rod lens that can be manufactured without decreasing the amount of incident light. The gradient index rod lens includes a lens body radially distributing refractive indexes. The lens body has a cross sectional outline formed by removing at least part of a peripheral portion of an original lens body.

7 Claims, 10 Drawing Sheets

GRADIENT INDEX ROD LENS, METHOD FOR MANUFACTURING GRADIENT INDEX ROD LENS, AND LENS ARRAY

BACKGROUND OF THE INVENTION

The present invention relates to a gradient index rod lens, a method for manufacturing a gradient index rod lens, and a lens array.

A gradient index rod lens is manufactured by performing a treatment, such as ion exchange, on a cylindrical piece of glass. This distributes refractive indexes from the central portion of the lens to the peripheral portion of the lens. The refractive indexes at the peripheral portion of the lens normally are not included in the intended gradient index rod range. Thus, the peripheral portion of the lens cannot be used. For example, referring to FIG. 27, a gradient index rod lens 11 has an effective portion 12. The effective portion 12 is located in the center of the gradient index rod lens 11 and has a diameter, which is denoted by De. Aberrations are tolerated In the effective portion 12. A peripheral portion 13 is defined around the effective portion 12. The refractive indexes distributed in the peripheral portion 13 are not included in the intended range. Accordingly, the diameter Do of the gradient index rod lens 11 is determined by adding a value obtained by multiplying the width of the peripheral portion by two to the effective diameter De of the effective portion 12. Since the refractive indexes distributed in the peripheral portion 13 are not included in the tolerable range, the focal point of the light that passes through the peripheral portion 13 differs from that of the light that passes through the effective portion 12. This produces a large aberration in the lens as shown by FIG. 28.

The conventional gradient index rod lens has a diameter that is significantly greater than the effective diameter of the effective portion 12, which is the portion actually functioning as a lens. Thus, when a plurality of gradient index rod lens are arranged to form a lens array 21, as shown in FIG. 29, the lenses increases the size of the lens array 21 and the pitch between effective portions 12. This lowers resolution. In the example shown in FIG. 29, the gradient index rod lenses 11 are arranged in V-shaped grooves of a substrate 22. To reduce the size of the lens array 21, the diameter Do of the lens may be decreased. However, this would decrease the area of the effective portion and decrease the amount of the light that enters the effective portion 12.

A planar micro-lens array has been proposed to decrease the size of a lens array. In one type of lens array, the gradient index rod is such that the refractive index differs at different depths in a substrate. In another type of lens array, the surface of a lens array is etched to form pits, and resins hating different refractive indexes are filled in the pits. However, satisfactory lens characteristics cannot be obtained when such lens arrays are used to connect optical fibers with optical devices.

SUMMARY OF THE INVENTION

It is an object of the present invention to provide a smaller gradient index rod lens without decreasing the amount of light that enters its effective portion.

To achieve the above object, the present invention provides a gradient index rod lens including a lens body radially distributing refractive indexes. The lens body has a cross sectional outline formed by removing at least part of a peripheral portion of a cylindrical original lens body.

A further perspective of the present invention is a method for manufacturing a gradient index rod lens. The method includes preparing a cylindrical original lens body and forming a lens body having a predetermined cross sectional outline by removing at least part of a peripheral portion of the original lens body.

A further perspective of the present invention is a lens array including at least a row of a plurality of gradient index rod lenses. Each of the gradient index rod lenses includes a lens body radially distributing refractive indexes. The lens body has a cross sectional outline formed by removing at least part of a peripheral portion of a cylindrical original lens body.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may beat be understood by reference to the following description of the presently preferred embodiments together with the accompanying drawings in which.

DETAILED DESCRIPTION OF THE PREFERRED EMBODIMENTS

Figure 1:
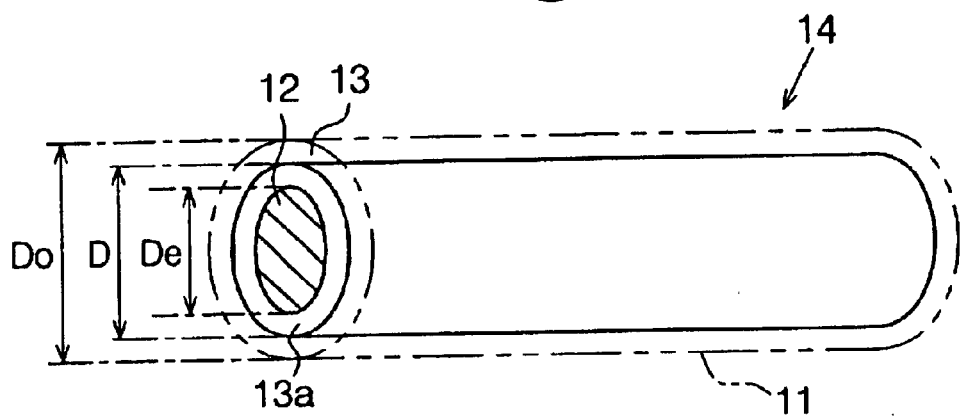
FIG. 1 is a perspective view showing a gradient index rod lens according to a first embodiment of the present invention.

In the drawings, like numerals are used for like elements throughout.

First Embodiment

A gradient index rod lens 14 and a lens array 16 according to a first embodiment of the present invention will now be described with reference to FIGS. 1 to 5.

Figure 2:
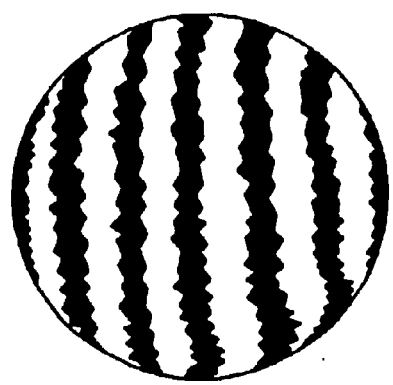
FIG. 2 is an explanatory diagram illustrating the aberration of the gradient index rod lens of FIG. 1.
Figure 27:
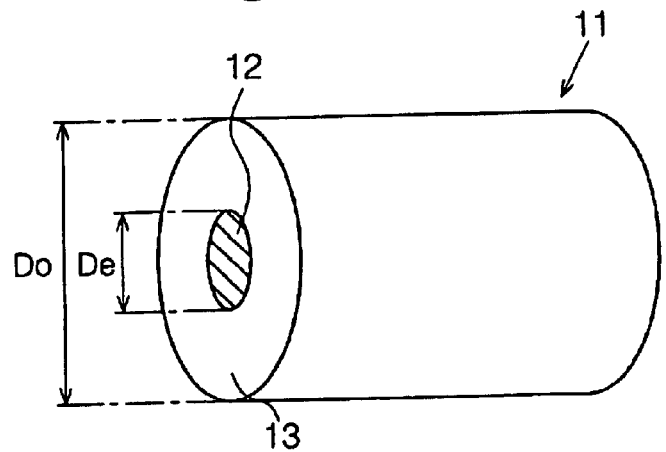
FIG. 27 is a perspective view showing a prior art gradient index rod lens.
Figure 28:
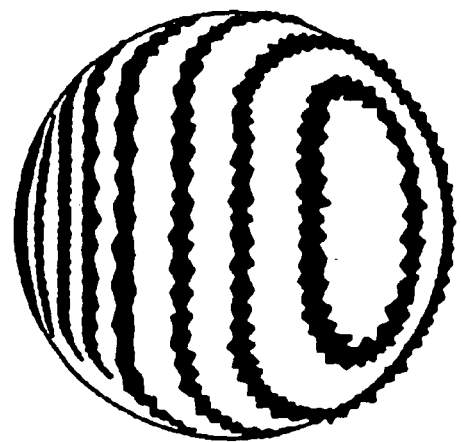
FIG. 28 is an explanatory diagram illustrating the aberration of the prior art gradient index rod lens.

In FIG. 1, the broken lines show a gradient index rod lens 11 (original lens), which is manufactured through a normally performed process. The gradient index rod lens 11 undergoes mechanical or chemical processing to partially remove its peripheral portion 13. The partial removal of the peripheral portion 13 exposes an underlying peripheral portion 13a of the lens 14. When the diameter of the lens 14 prior to the removal of the peripheral portions 13a is Do (refer to FIG. 27), the diameter D of the lens 14 of FIG. 1 subsequent to the removal of the peripheral portions 13a is smaller than Do. It is preferred that the peripheral portion 13 be partially removed so that the ratio between the effective diameter De of an effective portion 12 (indicated by diagonal lines) and the lens diameter D be $0.3 \leq De/D \leq 1$. In one example, the peripheral portions of a gradient index rod lens 11 satisfying the equation of De/Do=0.4 are removed to form a gradient index rod lens 14 satisfying the equation of De/D=0.9. FIG. 2 illustrates the aberration when only the effective portion 12 of the gradient index rod lens 14 is irradiated with light. As apparent from FIG. 2, the aberration is small. The peripheral portion may be removed by performing mechanical processing, or cylindrical grinding. If chemical processing is performed, the gradient index rod lens 11 is dipped into a hydrofluoric acid solution to partially remove the peripheral portions. The two ends of the lens 11 are then mechanically ground to form the gradient index rod lens 14. Further, all of the peripheral portions 13 may be removed (De/D=1) to form the lens 14. In this case, light enters only the effective portion 12. Thus, the aberration is similar to that shown in FIG. 2.

Figure 3:
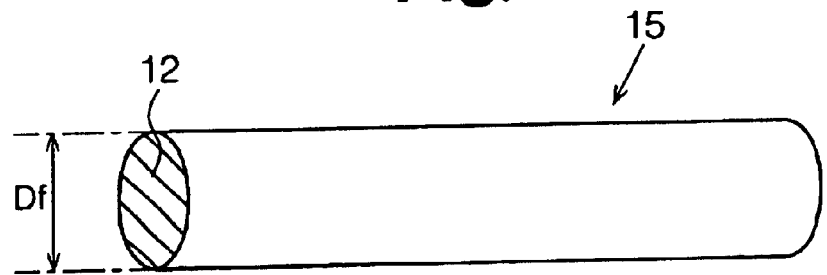
FIG. 3 is a perspective view showing a further gradient index rod lens according to the first embodiment of the present invention.

As shown in FIG. 3, all of the peripheral portion and part of the effective portion 12 may be removed to form a lens 15. In this case, the effective diameter Df of the lens subsequent to the removal satisfies Df<De. Thus, the entire gradient index rod lens 15 is the effective portion. The aberration of the lens is similar to that illustrated in FIG. 2

Figure 4:
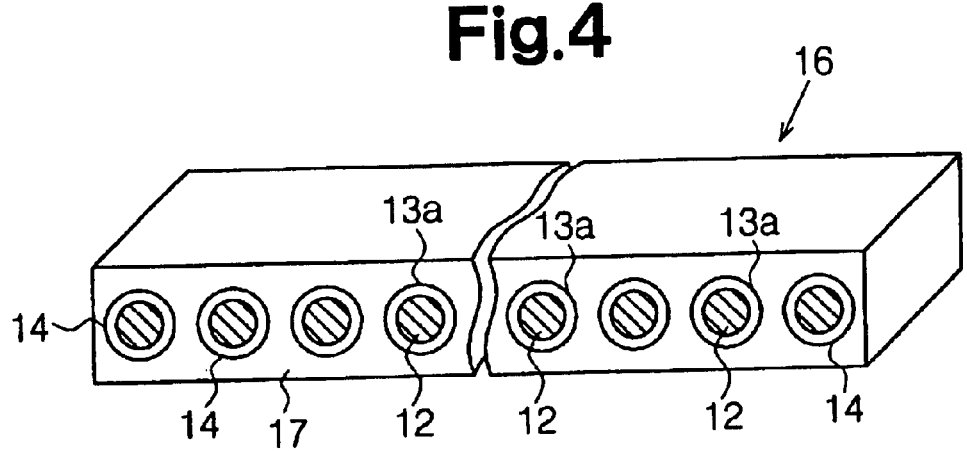
FIG. 4 is a perspective view showing a lens array including the gradient index rod lens of FIG. 1.

FIG. 4 is a schematic view showing a lens array 16 including a plurality of the gradient index rod lenses 14, from which the peripheral portions 13 have partially been removed. The lens array 16 is formed by embedding a plurality of the gradient index rod lenses 14 in a synthetic resin substrate. The effective diameter De of the effective portion 12 in each lens 14 is the same as that of the effective diameter in a conventional lens. However, the diameter D of each lens 14 is smaller than the diameter Do of the conventional lens. This decreases the pitch between the lenses 14, which, in turn, increases the resolution of the lens array 16.

Figure 5:
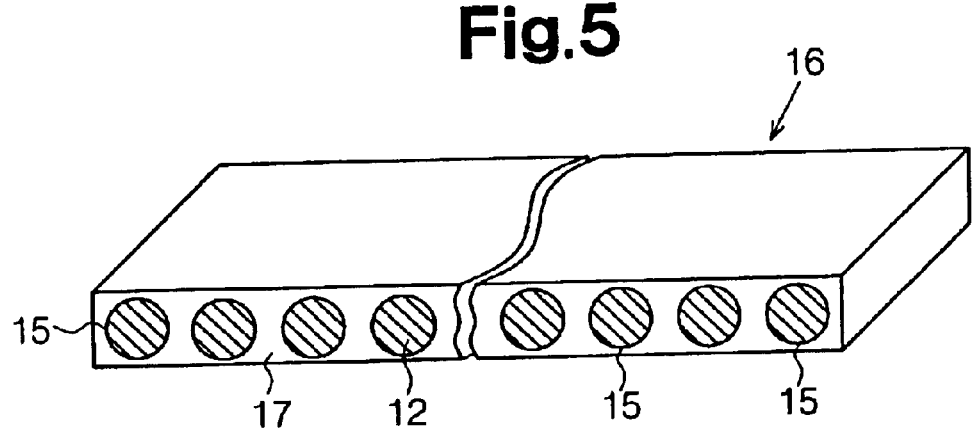
FIG. 5 is a perspective view showing a lens array including the gradient index rod lens of FIG. 3.

FIG. 5 is a schematic view showing a lens array 16 including a plurality of the gradient index rod lenses 15, from which all of the peripheral portions 13 and part of the effective portions 12 have partially been removed. In this case, the diameter of each lens 15 is smaller (Df<De) than that of the lens 14. Thus, the lens array 16 is more compact than that of FIG. 4 and has a higher resolution.

The gradient index rod lenses of the first embodiment have the advantages described below.

(1) In the gradient index rod lens 14, a predetermined amount of part of the peripheral portion 13 is removed from the lens 14, and the effective portion 12 remains intact in the lens 14. Thus, the lens 14 is made more compact without touching the effective portion 12. Further, the area occupied by the effective portion 12 in the gradient index rod lens 14 is greater than that of a conventional lens having the same lens diameter. Thus, light enters a wider effective portion. In other words, the amount of light entering the effective portion of the lens is increased.

(2) In the gradient index rod lens 15, part (outer portion) of the effective portion 12 is removed in addition to the peripheral portion 13. Thus, the effective portion occupies the entire lens 15, and the lens 15 is made more compact. Further, light enters an effective portion that is wider than that of a conventional lens having the same lens diameter. In other words, the amount of light entering the effective portion of the lens is increased.

(3) Mechanical processing, such as grinding, or chemical processing, such as etching, is performed to remove the peripheral portion 13. Thus, the amount of removed material may be accurately controlled by measuring the removed amount during the processing. In other words, the lenses 14, 15 may be accurately formed.

(4) The removal of the peripheral portions 13 forms the compact lenses 14, 15. Thus, the pitch of the lenses 14, 15 is small. As a result, the lens array 16 has a high resolution and a large capacity.

(5) In the lens array 16 that includes the gradient index rod lenses 14, 15, which have the large effective portions 12, the amount of light entering the effective portions 12 is large.

Second Embodiment

A gradient index rod lens 27 and a lens array 28 according to a second embodiment of the present invention will now be described with reference to FIGS. 6 to 9.

Figure 7:
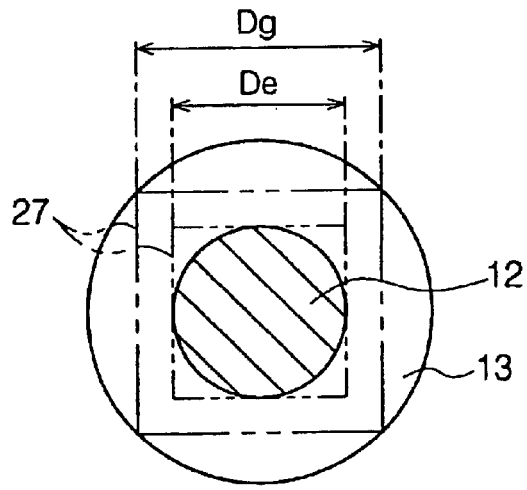
FIG. 7 is a front view showing the gradient index rod lens of the second embodiment.

Referring to FIG. 7, the gradient index rod lens 27 of the second embodiment has the form of a rectangular block. Further, the gradient index rod lens 27 is formed by machining the gradient index rod lens 11 to remove part of the peripheral portion 13 from the gradient index rod lens 11. The cross-section of the rectangular block is such that it corresponds to squares ranging from one circumscribing the effective portion 12 with each side having a length of De to one inscribing the circumference of the lens 11 prior to machining with each side having a length of Dg.

Figure 6:
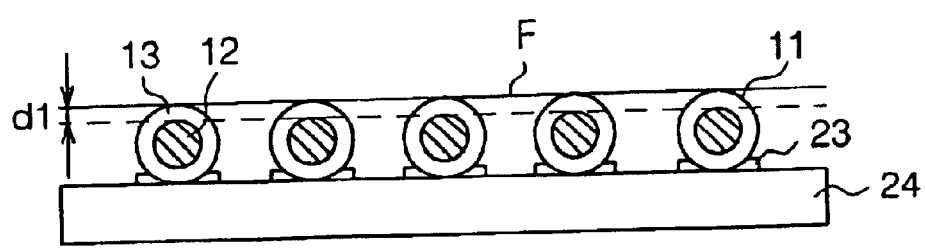
FIG. 6 is a schematic cross-sectional view illustrating a procedure for machining a gradient index rod lens in a second embodiment of the present invention.

The manufacturing of the lens 27 will now be described. As shown in FIG. 6, a plurality of the cylindrical gradient index rod lenses (rod lenses) 11 are arranged on a table 24. Wax 23 is applied to adhere and fix the lenses 11 to the table 24. The peripheral portions 13 of the lenses 11 is ground starting from a plane F that is parallel to the table 24 and tangential to the peripheral surfaces of the lenses 11. A first surface, or one of the four surfaces, of each lens 27 is formed when a predetermined amount d1 is ground. Referring to FIG. 7, the predetermined amount d1 is minimal when the length of each of the four sides of the lens 27 is Dg and maximal when the length of each of the four sides is De. After the grinding is completed, the wax 23 is melted to remove the lenses 11 from the table 24. The lenses 11 are then flipped over and adhered to the table 24 so that the ground surfaces contact the table 24. The predetermined amount d1 is then ground from the peripheral portions 13 on the other side of the ground surfaces in the same manner to form a second surface of each lens 27. Subsequently, the lenses 11 are rearranged on and fixed to the table 24 so that the two ground surfaces are perpendicular to the table 24. The predetermined amount d1 is ground to form a third surface of each lens 27. Then, the lenses 11 are flipped over and fixed to the table 24 to grind the predetermined amount d1 from the remaining peripheral portions 13 and form a fourth surface of each lens 27. This completes the formation of the rectangular block-like gradient index rod lenses 27.

Figure 8:
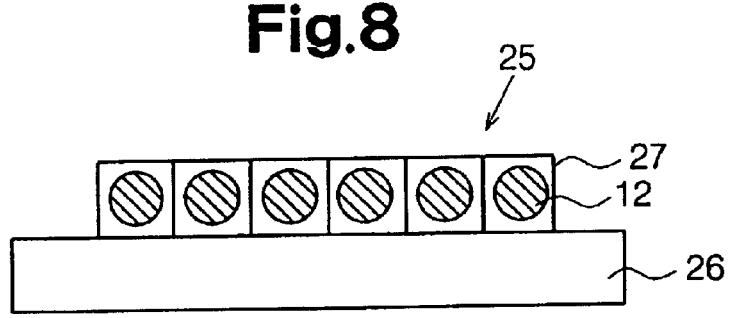
FIG. 8 is a front view showing a lens array including the gradient index rod lens of FIG. 7.
Figure 29:
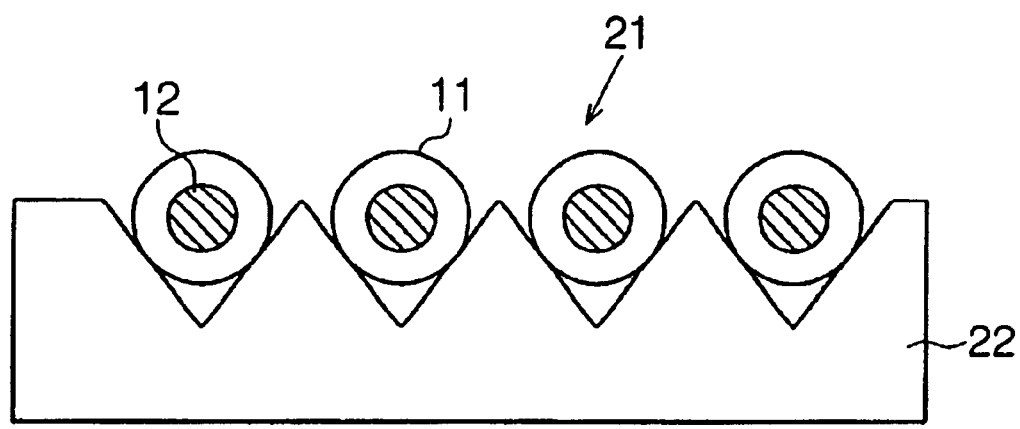
FIG. 29 is a front view showing a lens array including the prior art gradient index rod lens.

FIG. 8 is a schematic view showing the lens array 25 in which a plurality of the gradient index rod lenses 27 are arranged. The lens array 25 includes a substrate 26 and a plurality of the rectangular block-like gradient index rod lenses 27, which are arranged on the substrate 26. Since the lenses 27 have flat surfaces, the V-groove substrate 22 used in the prior art lens array 21, which is shown in FIG. 29, is not necessary. Further, since the peripheral portion 13 of each lens 27 is removed, the pitch between the lenses 27 is small. Thus, the lens array 25 has a resolution that is higher than that of the prior art lens array 21 shown in FIG. 29.

Figure 9:
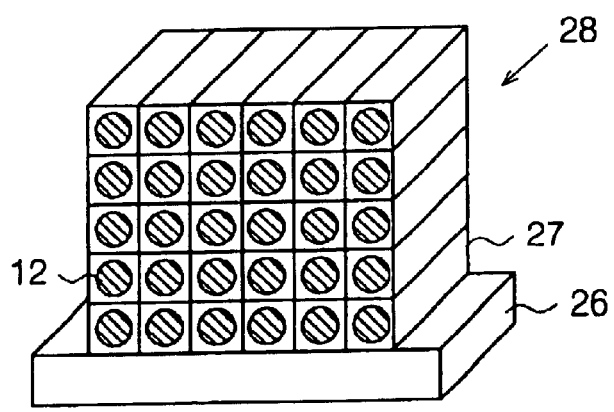
FIG. 9 is a perspective view showing a two-dimensional array including the gradient index rod lens of FIG. 7.

FIG. 9 is a schematic view showing a lens array 28 in which a plurality of the gradient index rod lenses 27 are arranged in a two-dimensional manner. Rows of the gradient index rod lenses 27 are superimposed on the substrate 26. When the lenses 27 are arranged in a two-dimensional manner, the pitch between the adjacent lenses 27 is relatively small. Thus, the two-dimensional lens array 28 has a high resolution.

In addition to advantages (1), (3), (4), and (5) of the first embodiment, the gradient index rod lens 27 of the second embodiment has the advantages described below.

(6) The lens 27 has the form of a rectangular block. This decreases the pitch between the lenses 27 and increases the resolution in one-dimensional and two-dimensional arrays.

(7) The lens 27 has a flat bottom surface (peripheral surface). Thus the lens array 28 is formed just by placing the lens 27 on the flat substrate 26. In other words, the pitch of the lenses 27 is accurately set without using an expensive V-groove substrate.

Third Embodiment

A gradient index rod lens 30 and lens arrays 29, 31, 32 according to a third embodiment of the present invention will now be described with reference to FIGS. 10 to 13.

Figure 10:
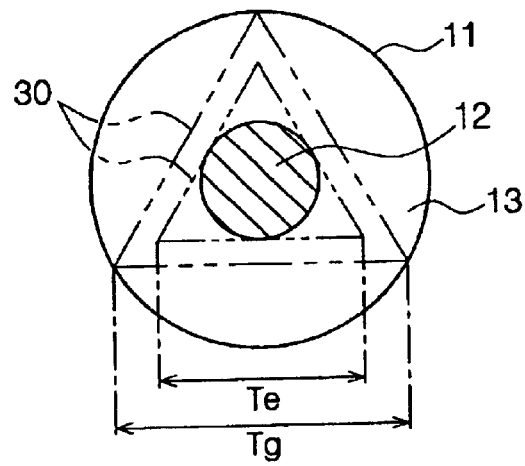
FIG. 10 is a front view showing a gradient index rod lens according to a third embodiment of the present invention.

Referring to FIG. 10, the gradient index rod lens 30 of the third embodiment has the form of a triangular block. Further, the gradient index rod lens 30 is formed by machining the gradient index rod lens 11 to remove part of the peripheral portion 13 from the cylindrical gradient index rod lens 11. The cross-section of the triangular block is such that it corresponds to a triangle ranging from one circumscribing the effective portion 12 with each side having a length of Te to one inscribing the circumference of the lens 11 prior to machining with each side having a length of Tg.

Since the lens 30 is manufactured in the same manner as the rectangular block-like lens 27 of the second embodiment, only the differing points will be described. The peripheral portions 13 of a plurality of the gradient index rod lenses 11, which are arranged on a table, are ground parallel to the table 24. A first surface, or one of the three surfaces, of each lens 30 is formed when a predetermined amount d1 is ground. The predetermined amount d1 is minimal when the length of each of the three sides of the lens 30 is Tg and maximal when the length of each of the three sides is Te. After the grinding is completed, the lenses 11 are removed from the table 24. The lenses 11 are then adhered to the table 24 in a state in which the first surfaces are inclined by 60° relative to the table 24. The predetermined amount d1 is then ground from the peripheral portions 13 to form a second surface of each lens 30. Subsequently, the lenses 11 are rearranged on and fixed to the table 24 so that the first and second surfaces are inclined by 60° relative to the table 24. The predetermined amount d1 is ground to form a third surface of each lens 30. This completes the formation of the triangular block-like gradient index rod lenses 30.

Figure 11:
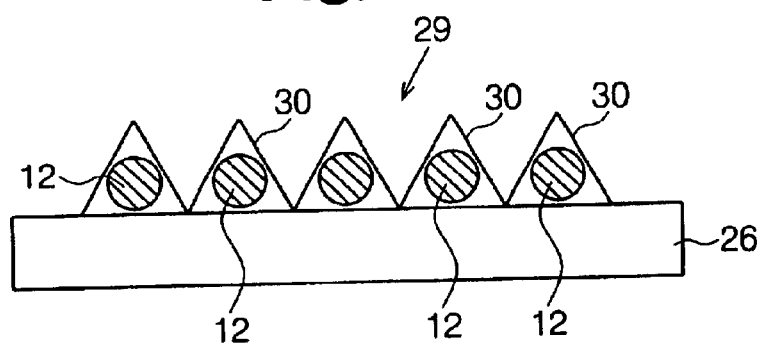
FIG. 11 is a front view showing a lens array including the gradient index rod lens of FIG. 10.
Figure 12:
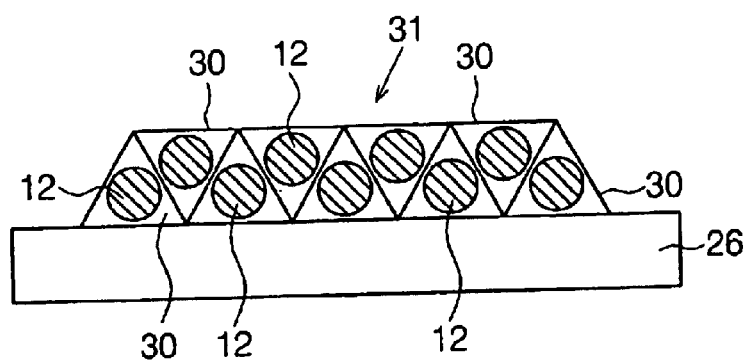
FIG. 12 is a perspective view showing a two-stage lens array including the gradient index rod lens of FIG. 7.

FIG. 11 is a schematic view showing the lens array 29, which includes a plurality of the gradient index rod lenses 30. The triangular block-like gradient index rod lenses 30 are arranged close to each other on a substrate 26. The lenses 30 have a flat bottom surface. Thus, the V-groove substrate used by the lens array 21 of FIG. 29 is unnecessary. Further, the two-dimensional lens array 31, which has a two-stage structure as shown in FIG. 12, is formed by arranging a plurality of the refractive distribution index lenses 30 between adjacent lenses 30, which have been arranged on the substrate 26.

Figure 13:
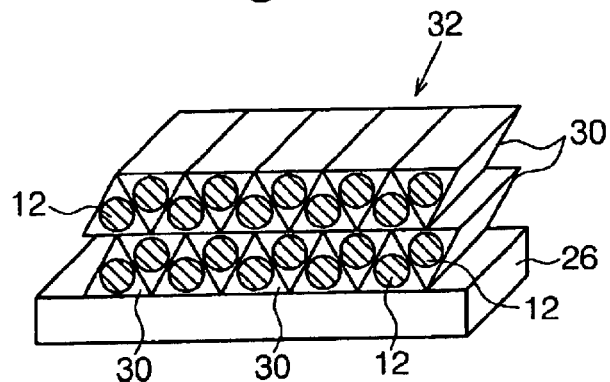
FIG. 13 is a perspective view showing a two-dimensional array including the gradient index rod lens of FIG. 10.

FIG. 13 is a schematic view showing the lens array 32, which includes three or more stages (in this case, four stages) of the triangular block-like gradient index rod lenses 30. In other words, a plurality of the triangular block-like gradient index rod lenses 30 are superimposed on the substrate 26.

In addition to advantages (1), (3), (4), (5), and (7) of the first and second embodiments, the gradient index rod lens 30 and the lens arrays 29, 31, 32 of the third embodiment has the advantage described below.

(8) The pitch of the triangular block-like lenses 30 is smaller than that of the cylindrical lenses 11. Thus, the one-dimensional lens array 29 and the two-dimensional lens arrays 31, 32 have a high resolution.

Fourth Embodiment

A gradient index rod lens 34 and lens arrays 33, 35 according to a fourth embodiment of the present invention will now be described with reference to FIGS. 14 to 16.

Figure 14:
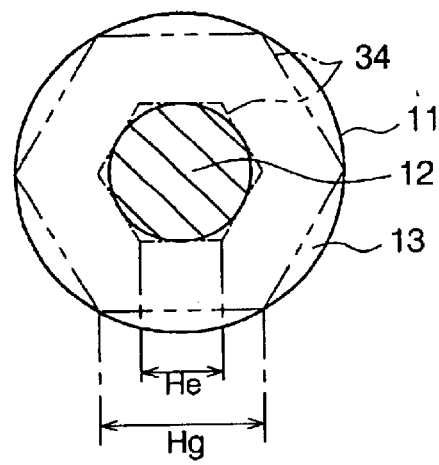
FIG. 14 is a front view showing a gradient index rod lens according to a fourth embodiment of the present invention.

Referring to FIG. 14, the gradient index rod lens 34 of the fourth embodiment has the form of a hexagonal block. Further, the gradient index rod lens 34 is formed by machining the gradient index rod lens 11 to remove part of the peripheral portion 13 from the cylindrical gradient index rod lens 11. The cross-section of the hexagonal block is such that it corresponds to a hexagon ranging from one circumscribing the effective portion 12 with each side having a length of He to one inscribing the circumference of the lens 11 prior to machining with each side having a length of Hg.

Since the lens 34 is manufactured in the same manner as the rectangular block-like lens 27 of the second embodiment, only the differing points will be described. The peripheral portions 13 of a plurality of the gradient index rod lenses 11 are arranged on a table 24 and ground parallel to the table 24. A first surface, or one of the six surfaces, of each lens 34 is formed when a predetermined amount d1 is ground. The predetermined amount d1 is minimal when the length of each of the six sides of the lens 34 is Hg and maximal when the length of each of the six sides is He. After the grinding is completed, the lenses 11 are removed from the table 24. Subsequently, the lenses 11 are ground to sequentially form second to sixth surfaces. Thus, the lenses 11 undergo grinding for a total of six times. This completes the formation of the hexagonal block-like gradient index rod lenses 34.

Figure 15:
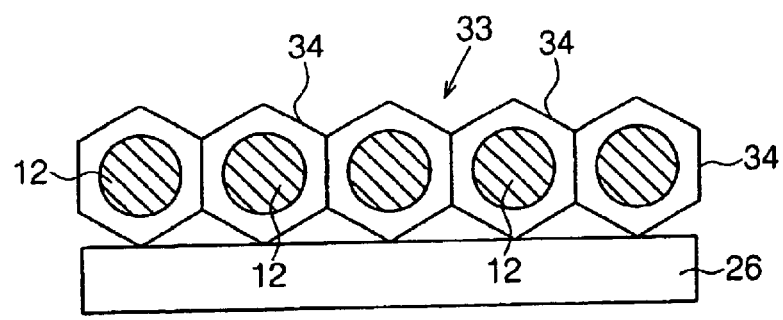
FIG. 15 is a front view showing a lens array including the gradient index rod lens of FIG. 14.
Figure 16:
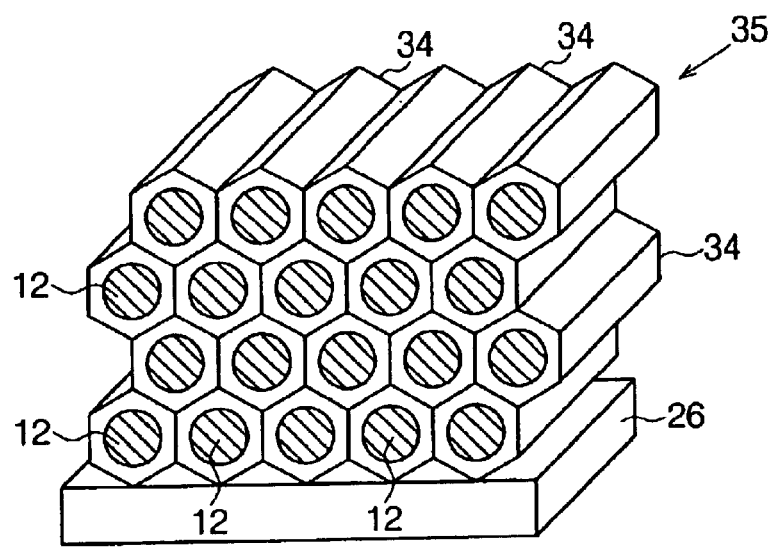
FIG. 16 is a perspective view of a two-dimensional array including the gradient index rod lens of FIG. 14.

FIG. 15 is a schematic view showing the lens array, which includes a plurality of the gradient index rod lenses 34. The hexagonal block-like gradient index rod lenses 34 are arranged on a substrate 26 in a state contacting side surfaces of the adjacent lenses 34. Since the lenses 34 have flat side surfaces, the side surfaces are easily connected with each other. FIG. 16 is a schematic view showing the lens array 35, which includes a plurality of the gradient index rod lenses 34 accumulated so as to have a dense structure.

In addition to advantages (1), (3), (4), (5), and (7) of the first and second embodiments, the gradient index rod lens 34 and the lent arrays 33, 35 of the fourth embodiment have the advantage described below.

(9) The hexagonal lens 34 is optimal for forming the two-dimensional lens array 35, which has a dense structure.

Fifth Embodiment

Gradient index rod lens 36, 39 and lens arrays 38, 40 according to a fifth embodiment of the present invention will now be described with reference to FIGS. 17 to 19.

Figure 17:
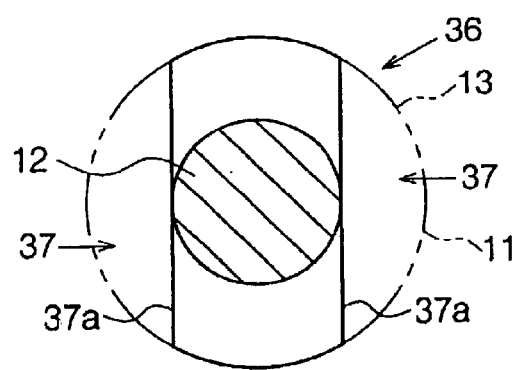
FIG. 17 is a front view showing a gradient index rod lens according to a fifth embodiment of the present invention.

As shown in FIG. 17, the gradient index rod lens 36 of the fifth embodiment has two parallel flat side surfaces 37a. The lens 36 is formed by machining the peripheral portion 13 to remove two side portions 31, which are located on opposite sides of the effective portion 12, from a lens 11. Each of the side surfaces 37a is formed by grinding the side portions 37 until reaching the effective portion 12. The grinding is performed in the same manner as in the second embodiment.

Figure 18:
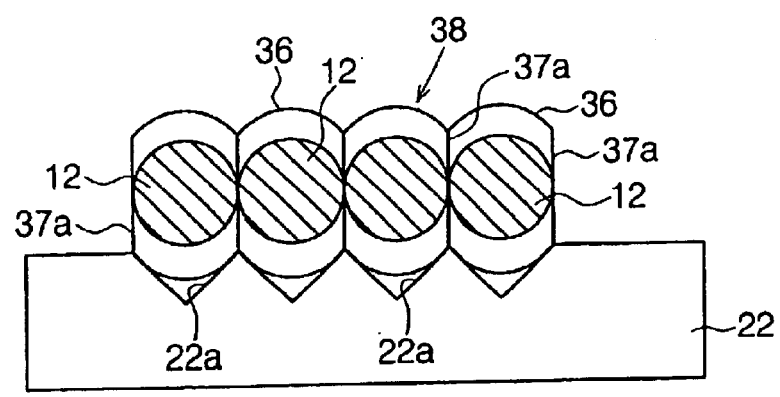
FIG. 18 is a front view showing a lens array including the gradient index rod lens of FIG. 17.

FIG. 18 is a schematic view showing the lens array 38, which includes a plurality of the lenses 36. The lens array 38 includes a substrate 22. V-shaped grooves 22a extend along the surface of the substrate 22. The gradient index rod lenses 36 are each arranged in one of the V-shaped grooves 22a. The V-shaped grooves 22a are formed by performing anisotropic etching or by dicing the substrate 22 with a diamond blade saw. The distance between adjacent V-shaped grooves 22a is determined by the distance between the two side surfaces 38a of each gradient index rod lens 36. Two arcuate surfaces extend between the two side surfaces 37a in each gradient index rod lens 36. Each lens 36 is arranged in the corresponding V-shaped groove 22a with parts of one of its arched surfaces contacting parts of the V-shaped groove 22a. Further, the adjacent lenses 36 are in contact with each other. Due to the closely arranged lenses 36, the lens array 38 has a high resolution.

Figure 19:
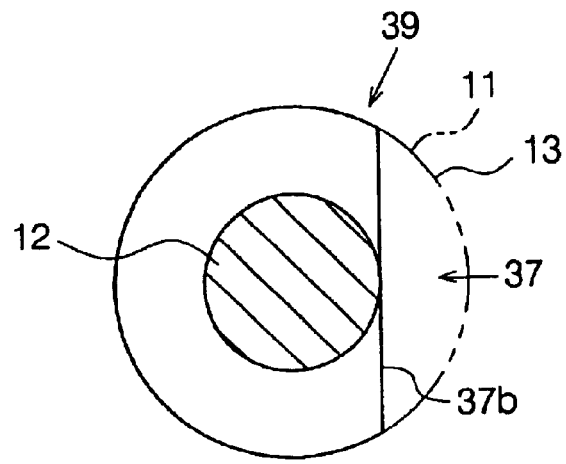
FIG. 19 is a front view showing a further gradient index rod lens according to the fifth embodiment of the present invention.
Figure 20:
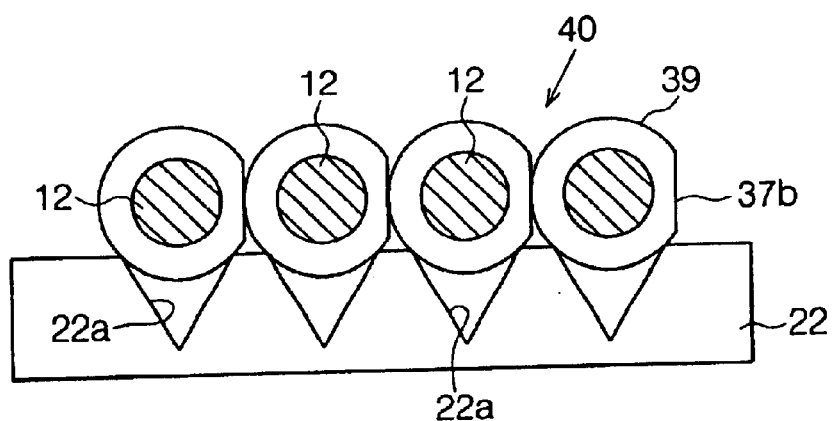
FIG. 20 is a front view showing a lens array including the gradient index rod lens of FIG. 19.

As shown in FIG. 19, the gradient index rod lens 39 has one flat side surface 37b. In this case, as shown in FIG. 20, the lens 39 is arranged on the substrate 22 so that the side surface 37b is perpendicular to the substrate 22. This decreases the pitch between the adjacent lenses 39. Thus, the lens array 40 has a high resolution.

In addition to advantages (1), (3), (4), and (5) of the first embodiment, the gradient index rod lens 36 and the lens arrays 38 of the fifth embodiment have the advantage described below.

(10) The lens 39 is arranged so that its arcuate surface contacts the V-shaped groove 22a and its side surface 37b is perpendicular to the substrate 22. Thus, the lens array 40 has a high resolution.

A first modification and a second modification of the lens 39 of the fifth embodiment will now be described with reference to FIGS. 21 to 24.

(First Modification)

Figure 21:
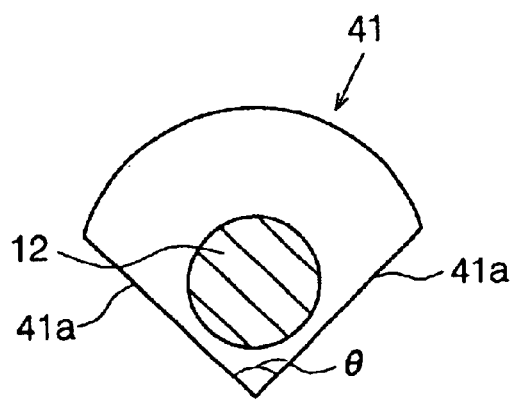
FIG. 21 is a front view of a gradient index rod lens according to a first modification of the fifth embodiment.
Figure 22:
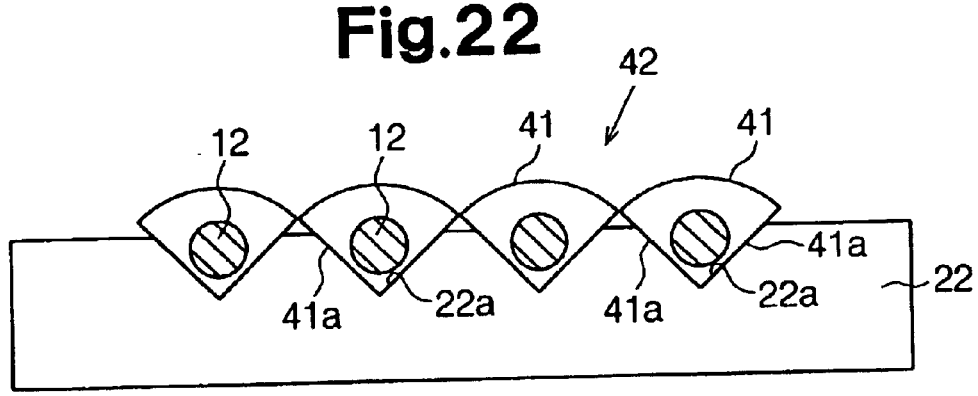
FIG. 22 is a front view showing a lens array including the gradient index rod lens of FIG. 21.

To form a lens array that employs V-shaped grooves 22a of a substrate 22, a lens 41 having a cornered portion, as shown in FIG. 21, is fitted in each of the V-shaped grooves 22a. The cornered portion of the lens 41 is defined by two side surfaces 41a, which are formed by grinding a cylindrical lens. The angle θ between the two side surfaces 41a of the cornered portion is 90°. As shown in FIG. 22, the cornered portion is fitted in the corresponding V-shaped groove 22a, the surfaces of which intersect at 90°. A plurality of the lenses 41 is arranged on the substrate 22 in the same manner to form the lens array 42, (Second Modification)

Figure 23:
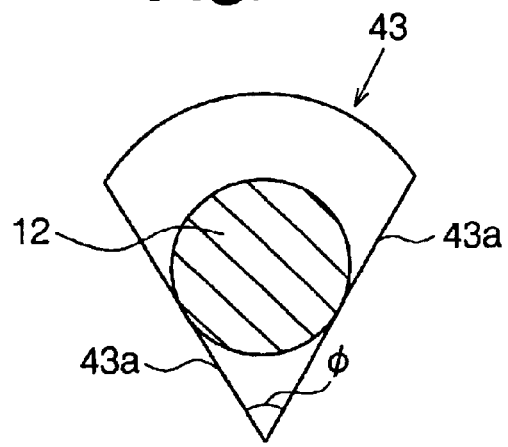
FIG. 23 is a front view of a gradient index rod lens according to a second modification of the fifth embodiment.
Figure 24:
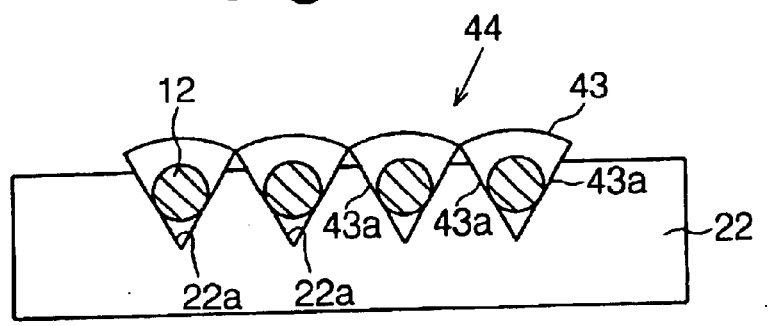
FIG. 24 is a front view showing a lens array including the gradient index rod lens of FIG. 23.

Referring to FIG. 23, a gradient index rod lens 43 has a cornered portion defined by two side surfaces 43a, which are formed by grinding a cylindrical lens until reaching the effective portion 12. The angle φ between the two side surfaces 43a of the cornered portion is 60°. As shown in FIG. 24, the lens 43 is arranged on a substrate 22 so that the cornered portion is fitted in a corresponding V-shaped groove 22a, the surfaces of which intersect at 60°. A plurality of the lenses 43 is arranged on the substrate 22 in the same manner to form the lens array 44.

Figure 25:
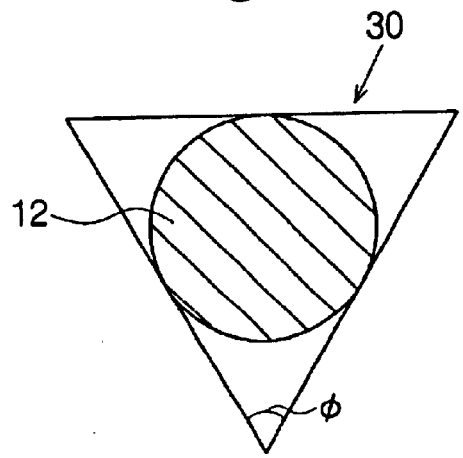
FIG. 25 is a front view showing a gradient index rod lens according to the third embodiment of the present inventions.

FIG. 25 shows the triangular block-like gradient index rod lens 30 of the third embodiment. The angle between the two sides of the triangular block-like gradient index rod lens 30 is 60°. A plurality of the lens 30 may be fitted in the 60° V-shaped grooves 22a to form a lens array on the substrate 22.

In addition to advantages (1), (3), (4), and (5) of the first embodiment, the first and second modifications have the advantage described below.

(11) The gradient index rod lenses 30, 41, 43 are cornered with an angle corresponding to the V-shaped grooves 22a. Thus, the lenses 30, 41, 43 are easily and accurately attached to the substrate 22.

It should be apparent to those skilled in the art that the present invention may be embodied in many other specific forms without departing from the spirit or scope of the invention. Particularly, it should be understood that the present invention may be embodied in the following forms.

Figure 26:
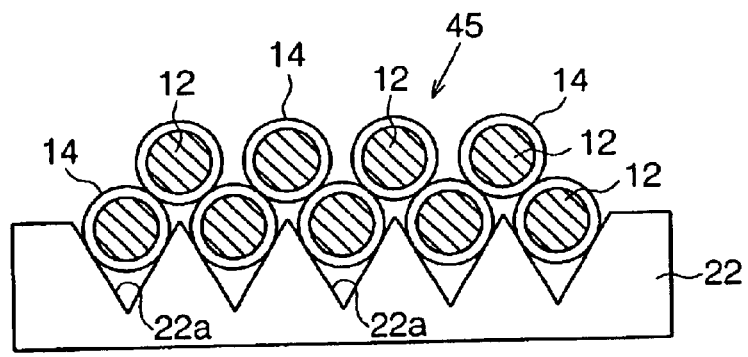
FIG. 26 is a front view showing a two-stage lens array including the gradient index rod lens of FIG. 1.

The cylindrical gradient index rod lenses 14 or 15 of the first embodiment may be arranged in the V-shaped grooves 22a, as shown in FIG. 26. Further lenses 14, 15 may be superimposed on the lenses 14, 15, which have been arranged in the V-shaped grooves 22a, to form a lens array 45 having a two-dimensional structure. This facilitates the arrangement of the cylindrical gradient index rod lens 14, 15.

The rectangular block-like gradient index rod lenses 27 of the second embodiment may be arranged in the V-shaped grooves of a substrate to form a lens array. In this case, the angle between the adjacent side surfaces of each lens is 90°. It is thus preferred that the angle of the V-shaped grooves be 90°.

The hexagonal block-like gradient index rod lenses 34 of the fourth embodiment may be arranged in the V-shaped grooves of a substrate to form a lens array. In this case, the angle between the adjacent side surfaces of each lens is 120°. It is thus preferred that the angle of the V-shaped grooves be 120°.

The gradient index rod lenses 36 or 39 of the fifth embodiment may be arranged on a flat substrate so that their flat surfaces 37a, 37b contact the surface of the substrate to form a lens array. A two-dimensional lens array may also be formed by a arranging a plurality of the lenses 36 on a substrate in this manner. In this case, the height of the gradient index rod lens 36 is relatively low. Thus, the two-dimensional lens array is relatively low.

The present examples and embodiments are to be considered as illustrative and not restrictive, and the invention is not to be limited to the details given herein, but may be modified within the scope and equivalence of the appended claims.

What is claimed is:

1. A gradient index rod lens comprising:
a lens body radially distributing refractive indexes, wherein the lens body has a cross sectional outline formed by removing at least part of a peripheral portion of a cylindrical original lens body, wherein the lens body includes an effective portion having an effective diameter (De) that tolerates aberration, wherein the ratio between the effective diameter and a diameter (D) of the lens body is $0.3 \leq De/D \leq 1$, wherein the lens body has a cross sectional outline larger than or equal to a first size circumscribing the effective portion and smaller than or equal to a second size inscribing a periphery of the original lens body, and wherein the cross sectional outline is one selected from a triangle, a square, and a hexagon.

2. A gradient rod lens comprising:
a lens body radially distributing refractive indexes, wherein the lens body has a cross section outline formed by removing at least part of a peripheral portion of a cylindrical original lens body, wherein the lens body includes an effective portion having an effective diameter (De) that tolerates aberration, wherein the ratio between the effective diameter and a diameter (D) of the lens body is $03 \leq De/D \leq 1$, wherein the lens body has a cross sectional outline larger than or equal to a first size circumscribing the effective portion and smaller than or equal to a second size inscribing a periphery of the original lens body, and wherein the cross sectional outline includes a plurality of flat surfaces and at least one arcuate surface.

3. A gradient rod lens comprising:
a lens body radially distributing refractive indexes, wherein the lens body has a cross sectional outline formed by removing at least part of a peripheral portion of a cylindrical original lens body, wherein the lens body includes an effective portion having an effective diameter (De) that tolerates aberration, wherein the ratio between the effective diameter and a diameter (D) of the lens body is $0.3 \leq De/D \leq 1$, wherein the original lens body includes an effective portion and a peripheral portion surrounding the effective portion, the cross sectional outline of the lens body is formed by removing all of the peripheral portion and part of the effective portion, and an effective diameter of the effective portion of the lens body is smaller than an effective diameter of the effective portion of the original lens body.

4. A method for manufacturing a gradient rod lens, the method comprising:
preparing a cylindrical original lens body; and
forming a lens body having a predetermined cross sectional outline by removing at least part of a peripheral portion of the original lens body, wherein the lens body includes an effective portion having an effective diameter (De) that tolerates aberration, wherein the ratio between the effective diameter and a diameter (D) of the lens body is $0.3 \leq De/D \leq 1$, wherein the lens body has a cross sectional outline larger than or equal to a first size circumscribing the effective portion and smaller than or equal to a second size inscribing a periphery of the original lens body, and wherein the cross sectional outline is one selected from a triangle, a square, and a hexagon.

5. A method for manufacturing a gradient rod lens, the method comprising:
preparing a cylindrical original lens body; and
forming a lens body having a predetermined cross sectional outline by removing at least part of a peripheral portion of the original lens body, wherein the lens body includes an effective portion having an effective diameter (De) that tolerates aberration, wherein the ratio between the effective diameter and a diameter (D) of the lens body is $0.3 \leq De/D \leq 1$, wherein the lens body has a cross sectional outline larger than or equal to a first size circumscribing the effective portion and smaller than or equal to a second size inscribing a periphery of the original lens body, and wherein the cross sectional outline includes a plurality of flat surfaces and at least one arcuate surface.

6. A lens array comprising:
at least a row of a plurality of gradient index rod lenses, wherein each of the gradient index rod lenses includes a lens body radially distributing refractive indexes, wherein the lens body has a cross sectional outline formed by removing at least part of a peripheral portion of a cylindrical original lens body, wherein the lens body includes an effective portion having an effective diameter (De) that tolerates aberration, wherein the ratio between the effective diameter and a diameter (D) of the lens body is $0.3 \leq De/D \leq 1$, wherein the lens body has across sectional outline larder than or equal to a first size circumscribing the effective portion and smaller than or equal to a second size inscribing a periphery of the original lens body, and wherein the cross sectional outline is one selected from a triangle, a square, and a hexagon.

7. A lens array comprising:
at least a row of a plurality of gradient index rod lenses, wherein each of the gradient index rod lenses includes a lens body radially distributing refractive indexes, wherein the lens body has a cross sectional outline formed by removing at least part of a peripheral portion of a cylindrical original lens body, wherein the lens body includes an effective portion having an effective diameter (De) that tolerates aberration, wherein the ratio between the effective diameter and a diameter (D) of the lens body is $0.3 \leq De/D \leq 1$, wherein the lens body has a cross sectional outline larger than or equal to a first size circumscribing the effective portion and smaller than or equal to a second size inscribing a periphery of the original lens body, and wherein the cross sectional outline includes a plurality of flat surfaces and at least one arcuate surface.

* * * * *